United States Patent

[11] 3,631,331

| [72] | Inventors | David O. Fairley<br>San Jose;<br>Stephen C. McIntyre, Redwood City, both of Calif. |
|---|---|---|
| [21] | Appl. No. | 62,305 |
| [22] | Filed | Aug. 10, 1970 |
| [45] | Patented | Dec. 28, 1971 |
| [73] | Assignee | GTE Automatic Electric Laboratories Incorporated<br>Northlake, Ill. |

[54] WAVEGUIDE FREQUENCY MULTIPLIER WHEREIN WAVEGUIDE CUTOFF FREQUENCY IS GREATER THAN INPUT FREQUENCY
11 Claims, 6 Drawing Figs.

[52] U.S. Cl............................................................. 321/69 W
[51] Int. Cl............................................................. H03b 19/00, H02m 5/16
[50] Field of Search............................................ 321/69, 69 W, 69 NL; 330/4.6, 4.9

[56] References Cited
UNITED STATES PATENTS

| 3,434,037 | 3/1969 | Habra............................. | 321/69 W |
| 3,287,621 | 11/1966 | Weaver.......................... | 321/69 W |
| 3,239,744 | 3/1966 | Ludwig et al. ................. | 321/69 W |
| 3,085,205 | 4/1963 | Sante............................. | 321/69 W |
| 2,970,275 | 1/1961 | Kurzrok......................... | 321/69 W |
| 3,286,156 | 11/1966 | Barkes........................... | 321/69 W |
| 3,281,647 | 10/1966 | Hines et al..................... | 321/69 W |
| 3,431,485 | 3/1969 | Lind et al....................... | 321/69 W |

Primary Examiner—Gerald Goldberg
Attorneys—Kurt Mullerheim, Leonard R. Cool and Russell A. Cannon ABSTRACT: A frequency multiplier for the microwave region utilizing electromagnetic waveguide characteristics for frequency isolation. An input cavity is provided within an output waveguide with a natural cutoff frequency of the waveguide providing high pass isolation of output from input and a varactor diode as a coupling probe to the input cavity and as a mode launcher to the output to thus eliminate the requirement for a transition between varactor circuit and waveguide output. High efficiency and broad bandwidth operation is obtained.

WAVEGUIDE FREQUENCY MULTIPLIER WHEREIN WAVEGUIDE CUTOFF FREQUENCY IS GREATER THAN INPUT FREQUENCY

BACKGROUND OF INVENTION

Frequency multiplication in the microwave range may be efficiently accomplished by the utilization of a varactor multiplier. It is noted that a varactor multiplier consists basically of a varactor diode having a nonlinear capacitance which when driven by a fundamental frequency signal produces many harmonics. The varactor itself is a reversed bias semiconductor diode in which the junction capacitance is a function of the voltage across the junction. A high-level input signal voltage is employed to excite the varactor and by nonlinear action of the junction capacitance of the varactor elements of charge are stored at harmonic frequencies. This stored charge is then removed as power at frequencies that are multiples of the driving frequency.

There are two general types of varactors circuit configurations that are used to generate harmonics. One of these types is the series-type circuit employing a varactor diode connected in series between the input and output circuits; however, this type of circuit does not particularly lend itself to the efficient heat removal required of high power multipliers. The second general circuit configuration is the utilization of the varactor in shunt between input and output circuits and this is generally preferred for high power multipliers inasmuch as one end of the diode can be mechanically connected to ground which in turn provides excellent heat removal properties.

Although a variety of different varactor frequency multiplier circuits have been developed certain difficulties have been encountered therewith in the microwave range because distributed element circuits must be employed rather than simple lumped element circuits. As a practical matter coaxial transmission line distributed element circuits are usually employed in the range from 500 MHz. to 6,000 MHz. while at frequencies about 6 GHz and above the input and/or output ports of the multiplier are usually provided by waveguides. Thus a multiplier doubling an input frequency of 3 GHz to produce an output at 6 GHz commonly employs input and output resonant circuits with the varactor diode common to both and the input and output resonant circuits may be quarter wave coaxial cavities with the output being adapted to a waveguide by means of a transition between the coaxial element and the waveguide. Such a transition from the coaxial TEM-mode to waveguide tends to reduce the efficiency of the multiplier both by the actual transformation losses involved and the resulting presence of a portion of the fundamental current in the output cavity which is resonant at the desired harmonic.

The present invention precludes the necessity of providing separate resonant cavities for input and output and the need for a transition from a coaxial cavity to a waveguide. The device of the present invention is formed entirely within a waveguide with the varactor diode being mounted therein electrically in shunt between input and output circuits.

SUMMARY OF INVENTION

The invention is provided as a single quarter wavelength waveguide section having a movable short across one end thereof and open at the other end for coupling to a waveguide transmission line. The input cavity includes a sliding probe through the waveguide narrow sidewall and utilizing the broad walls of the guide as the outer conductor. The cavity is resonated by adjusting the length of the probe which is energized by a direct tap from a coaxial line having the outer conductor grounded to the guide. Only the transverse electric and magnetic field mode is excited in the cavity due to the fact that the perimeter surrounding the center conductor, i.e., the probe, is less than one-half the input wavelength. A varactor is extended through a broad wall of the waveguide with a cylindrical projection or hat formed on the end of the varactor. The input signal is capacitively coupled to the capacitor hat on the diode and it is noted that this hat has the function of acting as a capacitor plate for coupling the input into the diode and as a launcher of the dominant $TE_{10}$ mode frequency-multiplied output signal down the waveguide. The amount of coupling between the varactor and the input cavity is determined primarily by the separation capacitance between the resonant input circuit and the input probe. The diode assembly is fixed in the center of the guide for maximum E-field excitation at the output frequency of the device.

Rather than employing external biasing, the multiplier varactor is self biased in that the junction of the diode is allowed to rectify the positive peak of the input waveform and thus to generate the bias voltage needed for bring it into proper operating range. A high-resistance bias resistor is employed to limit the bias voltage and increase stability of the device. In order to prevent the resistor from resonating in the multiplier operator range provision is made for AC decoupling of the diode from its bias circuit while yet providing a DC path.

With the varactor diode excited at the fundamental or input frequency the second harmonic will be the dominant mode propagated on the waveguide inasmuch as the cutoff frequency of the waveguide is above the fundamental input frequency. Additionally the input coaxial circuitry is mounted orthogonally to the output transverse electric field so that there will be no coupling at the output frequency to the input resonant circuit. Coupling of the output frequency to the waveguide is a function of the cross-sectional area of the varactor hat or cylinder and the height of the protrusion thereof into the waveguide. With the diode capacitance this then determines the natural resonant frequency of the output circuit which is required for maximum efficiency. Directional propagation of the output frequency along the waveguide is achieved by the above-noted sliding short on the opposite side of the input circuit from the varactor so as to assure an inphase combining and propagation of the output signal. Additionally, reactive tuning screws are employed to match the varactor assembly to the waveguide.

The above-noted novel construction of the frequency multiplier of the present invention eliminates the need for transformation from coaxial cavity to waveguide and provides a natural separation of input and output frequencies, as is required for efficient multiplier operation. There is provided hereby a broad band frequency multiplier as described in detail below together with an improved efficiency of multiplication and broadband operation. Bandwidth is maximized by reflection from a movable short rather than from a resonator and minimizing losses in resonant circuits.

DESCRIPTION OF FIGURES

The present invention is illustrated as to prior art, electrical circuitry and physical configuration of a single preferred embodiment thereof in the accompanying drawings wherein.

DESCRIPTION OF PREFERRED EMBODIMENT

A varactor multiplier operates to multiply an input frequency so as to produce a higher frequency output and the following description of the present invention is in reference to a frequency doubler operating to double an input frequency of 3 GHz to produce an output of 6 GHz It will, of course, be appreciated that these figures are only exemplary and furthermore that the invention is applicable to other frequency multiplication.

Figure 1:
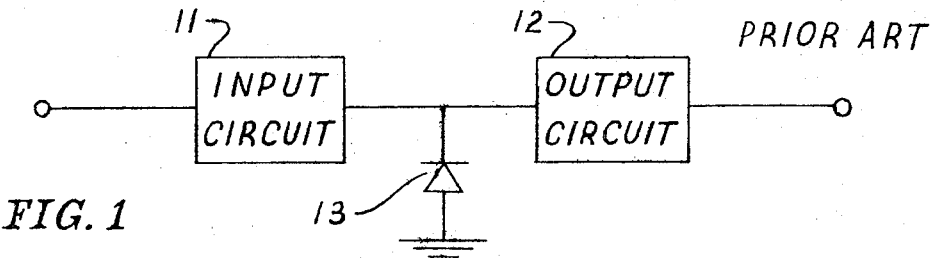
FIG. 1 is a block diagram of a conventional prior art shunt varactor multiplier.

There is illustrated in FIG. 1 a block diagram of a varactor frequency multiplier in which an input circuit 11 is shown to be coupled to an output circuit 12 by means of a shunt connected varactor 13. It will, of course, be appreciated that appropriate provision must be made for preventing direct coupling of the input frequency into the output circuit and also coupling of the output frequency into the input circuit. This is conventionally accomplished by the utilization of suitable filter means. Because of the nonlinear action of the junction capacitance of the varactor diode, elements of charge are stored in the junction at harmonic frequencies of the input frequency. The harmonic stored charge is removed as power at frequencies that are multiples of the driving or input frequency. According to the Manley-Rowe conditions the sum of the average power in the diode of the fundamental and second harmonic frequencies must be equal to zero. In order to achieve this condition it is necessary to match the input frequency to the varactor, to couple the second harmonic of the input frequency out of the varactor, to isolate the fundamental signal from the output and to isolate the second harmonic from the input.

Figure 2:
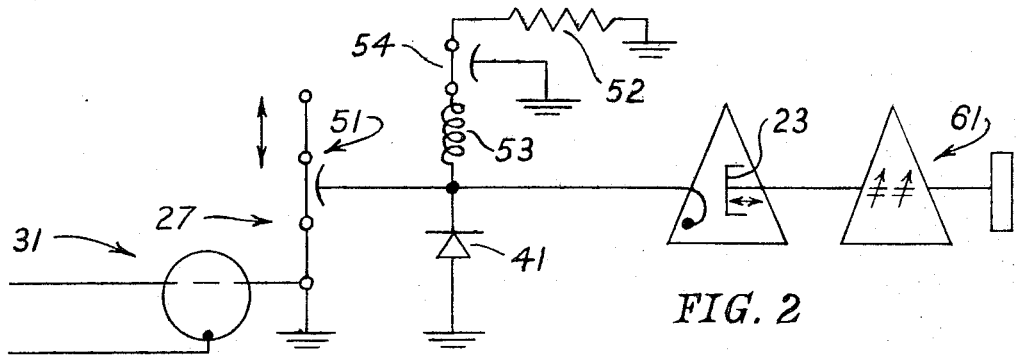
FIG. 2 is a schematic circuit diagram of an embodiment of the present invention.
Figure 3:
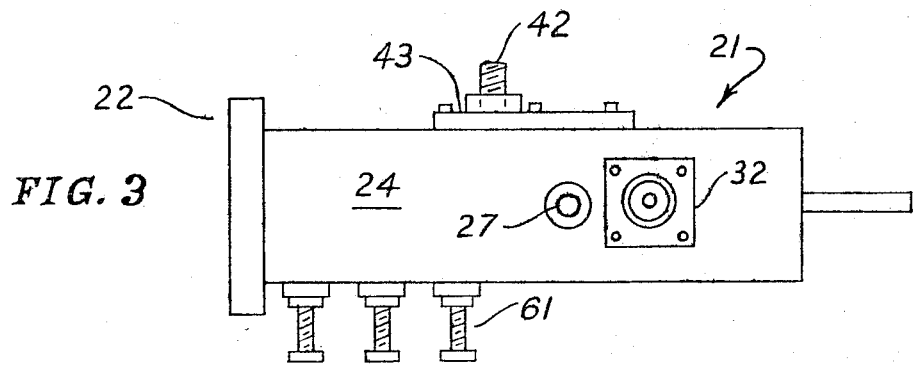
FIG. 3 is a bottom plan view of a waveguide frequency multiplier in accordance with the present invention.
Figure 4:
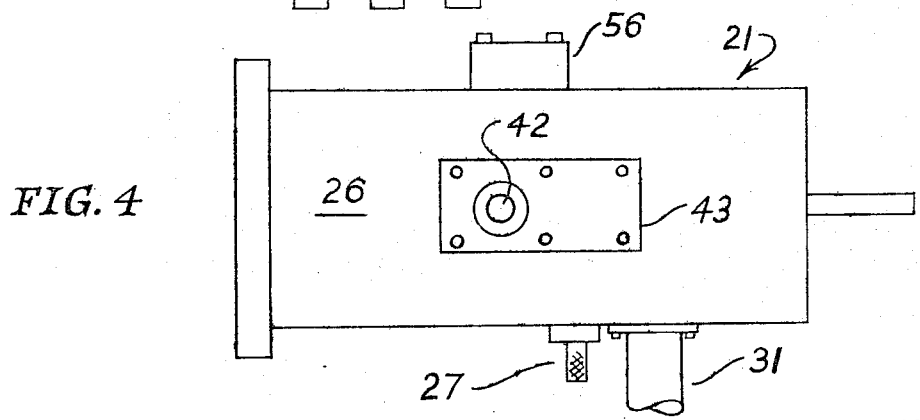
FIG. 4 is a side-elevational view of the device of FIG. 3.

There is illustrated in FIG. 2 a schematic circuit diagram of a frequency doubler in accordance with the present invention and such diagram is referred in connection with the following description of the physical embodiment of the present invention illustrated in FIGS. 3 to 6. The multiplier of the present invention is provided as a single waveguide section 21 having an open flange end 22 with the other end closed by a moving plunger 23 providing an adjustable electrical short across the opposite end of the waveguide section. The internal dimensions of the waveguide are predetermined for operation at the desired frequency of the device and in accordance with conventional practice the guide is formed with narrow top and bottom walls 24 and connecting broad walls 26.

Figure 5:
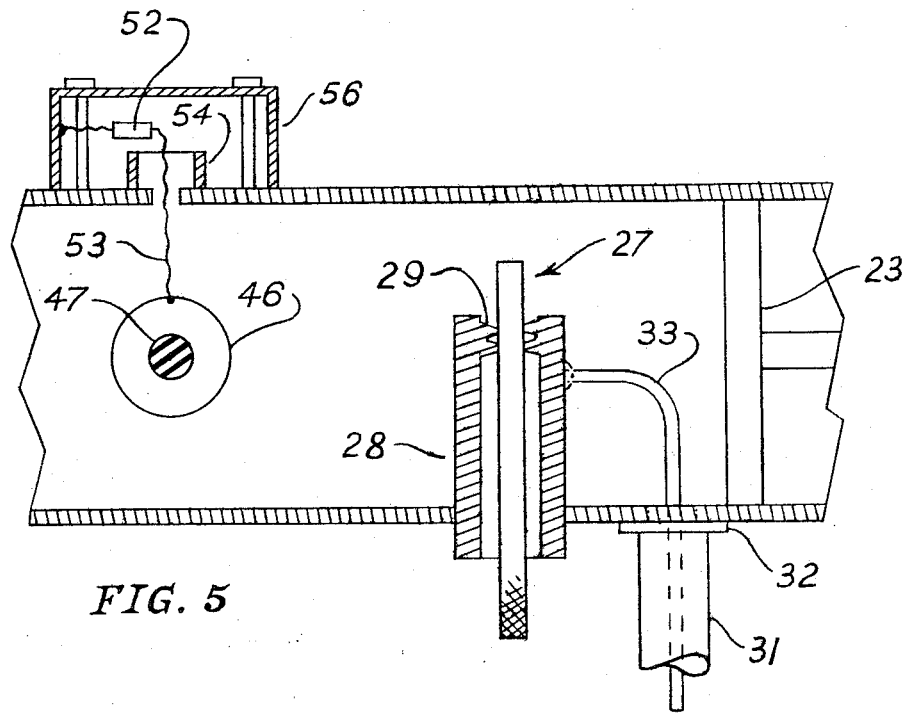
FIG. 5 is a partial side-elevational view of the multiplier of FIGS. 3 and 4 with a sidewall removed to show internal elements and connections of the multiplier.

Electrical energy at the input microwave frequency that may, for example, be 3 GHz is coupled into the waveguide cavity by means of exciting a movable resonator probe 27 extending through a narrow wall of the waveguide, as shown at FIG. 5. This probe 27 is surrounded by cylindrical bushing or the like 28 having resilient fingers or the like 29 about the top thereof gripping the probe 27 that is consequently movable through the bushing but is at all times maintained in electrical contact therewith. The probe is adjustably movable into and out of the waveguide so that the probe together with the bushing thereabout forms a quarter wavelength stub extending into the waveguide and resonant at the frequency of the input signal. Electrical energization of this probe is accomplished by the provision of a coaxial cable 31 joined to a coax connector 32 affixed to the narrow wall of the waveguide at an opening therethrough and having the center conductor 33 thereof extending upwardly into the waveguide and into electrical connection with the bushing 28 of the probe 27. It will be appreciated that inasmuch as the probe and bushing extends one-quarter wavelength into the waveguide the inner end of the probe 27 will be a point of maximum impedance insofar as the input microwave energy is concerned, and the central conductor 33 of the coax is connected to an appropriate point on the probe bushing to establish a desired impedance match between the coax and probe. As a practical matter the coaxial cable may have a characteristic impedance of 50 ohms and thus the central conductor 33 may be attached to the bushing 28 at a point having a microwave frequency impedance to the waveguide wall of 50 ohms.

It may be considered that the probe and broad walls 26 of the waveguide form a slab cavity that is closed only on the two sides formed by the broad walls. This cavity is in fact a shorted quarter wave transmission line or cavity that will thus resonate at the input frequency. Consequently it will be seen that the input signal is coupled into the waveguide and there is provided in accordance with the present invention a varactor 41 that is coupled to this input frequency.

Figure 6:
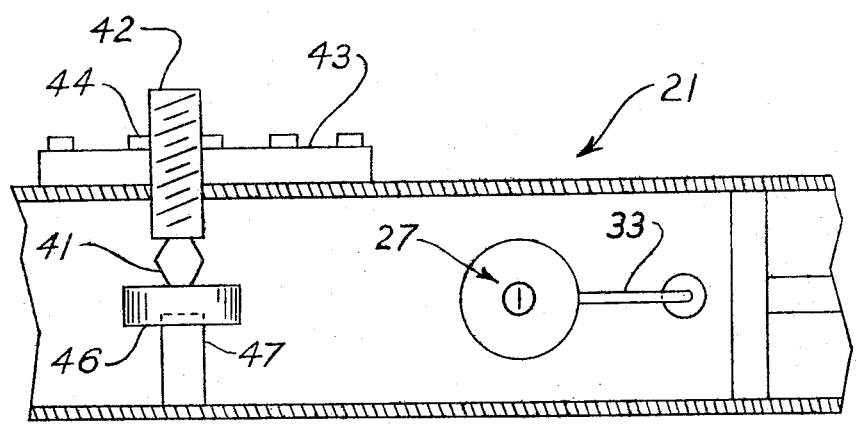
FIG. 6 is a partial plan view of the multiplier of FIGS. 3 and 4 with the top wall removed.

Referring now to FIG. 6, the varactor diode 41 will be seen to be mounted upon a chuck 42 threaded through the mounting block 43 attached to the exterior of a broad wall of the waveguide. A locking nut 44 may be provided about the chuck 42 to lock the chuck and consequently the diode in desired position. Within the waveguide section there is provided what may be termed a "hat" which in actuality comprises a cylindrical electrical conductor 46 of substantial diameter with respect to the diode which is mounted within the waveguide upon an insulator 47 extending from the opposite broad wall of the waveguide section from the chuck and diode. In practice the hat 46 is fixedly mounted in the waveguide at the vertical center thereof and slightly displaced from the probe 27. The diode connected to the chuck 42 is then moved into the waveguide into electrical contact with the hat and the lock nut is tightened to fix the diode in such position. There may, for example, be provided a spring load connection in the chuck in order to prevent damage to the diode.

With regard to the input of energy to the waveguide section, it has been noted above that the probe extends a quarter wavelength into the waveguide and that this then forms a resonant coaxial cavity with the broad walls of the waveguide. Only the transverse electric and magnetic field mode is excited by this input energy because the perimeter surrounding the central conductor or probe 27 of the cavity is less than one-half the input wavelength. This input energy is capacitively coupled to the diode 41 by means of the hat 46.

With regard to the input circuit reference is made to FIG. 2 illustrating a circuit diagram of the present invention and wherein there is shown the input coaxial cable 31 connected to the probe 27. It is particularly noted that in FIG. 2 the ground connections are indicative only of DC ground and do not indicate an electrical ground for microwave energy. A portion of the probe is movable as indicated in FIG. 2 to thus adjust the entire probe length to one-quarter wavelength of input frequency and the diode 41, having one side thereof grounded, is shown to be capacitively coupled by a capacitance 51 to the probe. This capacitance exists in the waveguide as the space between the probe and diode hat 46. With regard to the diode itself, it is noted that same is self biased, i.e., the diode junction as allowed to rectify the positive peak of the input waveform and therefore generates the bias voltage needed for bringing it into its proper operating range. In order to limit the bias voltage and to increase the stability of the diode a high resistance bias resistor 52 is connected in shunt across the diode. In this respect a metal film resistor may be employed; however, it is noted that such is likely to resonate in the multiplier operating range and consequently it is necessary to AC decouple the diode from its bias circuit while providing a DC path. To this end there is incorporated in the present invention a small wire 53 extending orthogonally from the diode hat 46 to the sidewall of the waveguide. This length of small diameter wire acts as a radio frequency choke at both input and output microwave frequencies of the present invention. Such choke is shunted to ground by a coaxial capacitor 54. The circuitry of the diode bias circuit is illustrated in FIG. 2 and the physical configuration is the same as shown in FIG. 5. In practice the coaxial shunt capacitor 54 may be provided externally of the waveguide structure with the choke coil 53 extending through a small aperture in the waveguide wall through the coax and connected to one end of the resistor 52 that in turn has the other end thereof electrically connected to the interior of a small metal box or housing 56 mounted upon the narrow wall of the waveguide section.

As a further portion of the present invention there may be provided reactive tuning screws 61 extending through a wall of the waveguide into the interior thereof and adjustable insofar as such extension is concerned in order to properly tune the waveguide output to the desired output frequency of the multiplier. These tuning screws are conventional.

Considering now the operation of the present invention somewhat further it is again noted that the microwave input signal to be multiplied is applied from a coaxial line 31 via the central conductor 33 thereof to a probe extending into the waveguide onequarter wavelength of input frequency, as illustrated for example in FIG. 5. The connection of the probe 27 with the surrounding bushing 28 thereof is accomplished by means of electrically contacting fingers between bushing and central probe member adjacent the outer end of the probe so as to thereby establish a substantial microwave frequency impedance between the connection and the waveguide section wall. Similarly the central coaxial conductor 33 is connected to the bushing 28 of the probe at a distance near one-quarter wavelength from the waveguide wall at the input microwave frequency so as to also provide a substantial impedance to RF-energy flow between such connection and the waveguide wall. There is thus established within the waveguide what may be termed a slab coaxial cavity formed by the probe as a central conductor of the coax and the broad walls of the waveguide section as the outer conductor. This then resonates at the input frequency of, for example, 3 GHz Only the transverse electrical magnetic field mode is excited by the input energy in view of the fact that the perimeter of the waveguide surrounding the center conductor and forming the coaxial cavity is made less than one-half the input wavelength. Furthermore the waveguide is formed with a lower cutoff frequency that is higher than the frequency of the input signal and consequently the input signal is not propagated out of the waveguide section. There is, however, a capacitive coupling between the input probe 27 and the varactor diode hat 46 to thus excite the varactor diode and consequently to generate not only the required diode bias but also the various harmonics of the input.

The main harmonic generated by the varactor is the second harmonic and such may, in fact, be the output of the present invention. The capacitor coupling between prove and diode hat occurs by virtue of the proximity of the two. The diode hat has the first function of acting as a capacitor plate for coupling the input into the diode and furthermore has a second function as a launcher of the desired harmonic frequency generated in the varactor diode. In this instance, assuming that the present invention is employed as a two times multiplier or doubler, the diode hat then functions as the launcher of a frequency doubled signal in both directions from the hat along the waveguide. As noted above, the diode assembly is fixed in the center of the guide for maximum E-field excitation and there is thus produced the dominant $TE_{10}$ doubled frequency signal from the diode hat. The waveguide short or plunger 23 is adjusted so that the frequency doubled signal launched or radiated from the diode hat is reflected from the short so as to return to the diode hat in phase with the frequency doubled signal radiated or launched in the opposite direction from the hat. Coupling of the frequency doubled signal, in this instance 6 GHz, to the waveguide is a function of the cross-sectional area of the varactor hat 46 and the height of the protrusion thereof into the waveguide. The height of the hat and thus the position of the varactor diode determines the natural resonant frequency of the output circuit as required for maximum efficiency. As noted above directional propagation of the desired harmonic frequency down the waveguide toward the open end thereof is achieved by the sliding short or plunger 23 on the opposite side of the input circuit from the varactor. Proper positioning of this short assures an inphase combination of the output frequency at the varactor and propagation of the output frequency, in this case a 6 GHz signal, to the left in the waveguide.

The present invention reduces circuit losses and complexity to increase the ease of tuning for optimum efficiency and bandwidth. With regard to bandwidth, it is noted that the output is reflected off of a broadband short rather than from a resonator which is inherently narrow band. Also by employing the varactor hat as an input signal receiver and a signal launcher there is eliminated any transmission line length for launching or transformation to preclude narrow bandwidth reflections.

It will be seen from the foregoing description of structure and operation that the novel construction of the present invention eliminates the need for transformation from a coaxial cavity to waveguide and provides a natural separation of input and output frequencies, as is required for efficient multiplier operation. In this respect it is additionally noted that all of the input frequency circuitry is mounted orthogonally to the output frequency transverse electric field so that there is no coupling at the output frequency to the input resonant circuit. As an example of the present invention it is noted that testing and evaluation of a unit constructed in accordance with the foregoing description having a 3 GHz input and 6 GHz output resulted in a 2.6 db. conversion loss over a 5 percent bandwidth centered at 6.6 GHz. The input power was 2–4 watts for this 55 percent efficiency. With regard to the output, both fundamental input frequency and unwanted higher harmonics were greater than 25 db. below the required output. The invention also accommodates various alternatives and variations in input and output coupling configurations without departing from the spirit and intent of the invention. Thus, for example, transformer steps in the output may be employed for broader matching of output and impedance. Alternative coupling may be employed between the input and output circuits and variations may, of course, be made in the diode biasing method. Although the present invention has been described with respect to a specific example of frequency doubling it is noted that higher order of multiplication may be employed with this invention as, for example, by the utilization of an idler circuit in series with a diode in accordance with known theories relating to idler circuits in connection with varactor frequency multipliers.

What is claimed is:

1. A waveguide frequency multiplier for microwave frequencies comprising
    a section of waveguide having a bottom cutoff frequency that is above an input frequency that is to be multiplied,
    a movable probe extending through a narrow wall of the waveguide and adapted to be adjusted to a length of one-quarter wavelength of input frequency to thus define a resonant coaxial cavity across the waveguide,
    input means energizing said probe at a frequency to be multiplied,
    a varactor diode having an enlarged metal end extending into the waveguide from a broad wall thereof and disposed adjacent said probe for capacitive coupling thereto and launching doubled signals, said varactor diode having the end thereof opposite said metal end electrically grounded to said waveguide, and
    movable electrical shorting means extending across said waveguide on the opposite side of said probe from said varactor and adjustable to reflect frequency multiplied signals from said enlarged diode end back in phase with said signals propagated in the opposite direction out of the waveguide.

2. The multiplier of claim 1 further defined by said input means comprising a coaxial cable having the outer conductor connected to said waveguide and the inner conductor extending through an opening in a waveguide narrow wall into connection with said probe within said waveguide.

3. The multiplier of claim 1 further defined by the internal perimeter of said waveguide about said probe having a total length less than one-half wavelength of input frequency whereby only the transverse electric and magnetic field mode is excited.

4. The multiplier of claim 1 further defined by said varactor diode being mounted in the middle of the broad wall of said waveguide.

5. The multiplier of claim 1 further defined by an RF-choke wire extending from the enlarged metal end of said varactor diode orthogonally to the direction of diode extension into the waveguide, a bias resistor grounding said choke wire, and means capacitively shunting said resistor to DC ground.

6. A waveguide frequency multiplier for microwave frequencies comprising a waveguide section having an open output end and a movable end wall at the opposite end, said waveguide having parallel narrow walls connected by parallel broad walls, the waveguide having a lower cutoff frequency above the frequency of an input frequency to the waveguide, means coupling an input signal into the waveguide and including a probe extending through a narrow wall of the guide and being adjustable to extend one-quarter wavelength of input signal into the waveguide in proximity to said movable end wall to establish a coaxial resonant cavity in the waveguide at said input frequency, a varactor diode mounted upon a broad wall of the waveguide therein and extending perpendicularly to said probe adjacent thereto and toward the open waveguide end therefrom with means capacitively coupling the diode to the probe for excitation of the diode, and a bias limiting resistor connected in shunt with said diode and means for AC decoupling the diode and resistor, said movable end wall being positioned to establish resonance at a desired output frequency of the diode whereby energy of such frequency is propagated along the waveguide to the open end thereof.

7. The multiplier of claim 6 further defined by said input means comprising a metal bushing about said probe and engaging said waveguide and engaging said probe adjacent the inner end thereof, and a coaxial connector secured to the waveguide narrow wall at an opening therein adjacent the probe and having a central coaxial conductor extending through said opening into contact with said bushing at a distance from the waveguide wall that established an RF-impedance matching the impedance of a coaxial input cable to be attached to the coaxial connector.

8. The multiplier of claim 6 further defined by a mounting block and heat sink secured to the exterior of said waveguide at a broad wall thereof, metallic diode mounting means threaded in said mounting block and extending through the waveguide broad wall with said diode mounted on the inner end thereof for adjustably positioning the diode in the waveguide and electrically grounding one side of the diode, and a metal hat mounted in the waveguide upon an insulator in line with the diode and adjacent said probe for engagement with said diode to capacitively couple the diode and probe and to launch frequency multiplied signals from the diode into the waveguide.

9. A waveguide frequency doubler for microwave frequencies comprising, a single waveguide section having a first open output end and a second end with an adjustably movable end wall thereacross, input means including a coaxial input line having the outer conductor connected to a narrow wall of the waveguide adjacent the second waveguide end and the central conductor extending through the narrow wall into the waveguide, and a metal probe adjustably extending into said waveguide through said narrow wall and having said central coaxial conductor connected thereto adjacent the inner probe end, said probe length being adjustable to one-quarter wavelength of input frequency, a shunt varactor within said waveguide and having a first end connected to a broad wall of said waveguide, a metal element disposed within said waveguide adjacent said probe on the opposite side thereof from said movable end wall and engaging a second end of said varactor to capacitively couple input energy to said varactor and to launch varactor signals into the waveguide, and said waveguide having a lower cutoff frequency above the input frequency to prevent coupling of the input signals to the output and said varactor output being orthogonal to the input to decouple same from the input, whereby adjustment of the waveguide end wall reinforces frequency doubled signals from the varactor radiated from said metal element toward the open waveguide end.

10. A waveguide frequency multiplier for microwave frequencies comprising a waveguide section having an open output end, an end wall at the opposite end, and a first pair of parallel walls that are perpendicular to a second pair of parallel walls, the waveguide having a lower cutoff frequency that is greater than the frequency of an input signal, means coupling the input signal into the waveguide and including a probe extending through one of the first walls into the waveguide and operable to establish a coaxial resonant cavity across the waveguide at the input frequency, a varactor diode mounted in the waveguide on one of the second walls to extend perpendicular to said probe and second walls, and an enlarged electrically conductive member spaced from said walls in the waveguide and engaging one end of said diode for capacitively coupling the diode to the probe for excitation of the diode and launching frequency double signals from the latter into the waveguide, said diode being spaced in the order of one-quarter wavelength from the end wall whereby frequency doubled signals reflected from the latter reinforce frequency doubled signals from the diode radiated toward the open end of the waveguide.

11. The multiplier according to claim 10 including means for tuning the waveguide cavity formed between said diode and the end wall.

* * * * *